Oct. 16, 1962 P. KOLLSMAN Re. 25,265

REDUCTION OF POLARIZATION IN LIQUID STREAMS UNDERGOING DEIONIZATION BY ELECTRODIALYSIS

Original Filed Oct. 22, 1957 4 Sheets-Sheet 1

INVENTOR.
Paul Kollsman

BY
Howard B. Russell
his ATTORNEY

INVENTOR.
Paul Kollsman
BY
Howard G. Russell
ATTORNEY

INVENTOR.
Paul Kollsman
BY
Howard S. Russell
his ATTORNEY

INVENTOR.
Paul Kollsman

BY
Howard B. Russell
his ATTORNEY

United States Patent Office

Re. 25,265
Reissued Oct. 16, 1962

25,265

REDUCTION OF POLARIZATION IN LIQUID STREAMS UNDERGOING DEIONIZATION BY ELECTRODIALYSIS

Paul Kollsman, 100 E. 50th St., New York, N.Y.

Original No. 2,891,900, dated June 23, 1959, Ser. No. 691,673, Oct. 22, 1957. Application for reissue Nov. 21, 1960, Ser. No. 70,881
11 Claims. (Cl. 204—180)

Matter enclosed in heavy brackets [ ] appears in the original patent but forms no part of this reissue specification; matter printed in italics indicates the additions made by reissue.

This invention, which is *presented in* a continuation in part of application Serial No. 347,693, *filed April 9, 1953 and now abandoned,* relates to apparatus for modifying the chemical composition of fluids by a controlled transfer of ions from, or into, fluids under influence of a suitable bias, for example, an electric current.

The transfer of ions takes place through semipermeable walls separating fluid volumes from one another. The walls, also called membranes or diaphragms, are semipermeable in the sense that they permit ions to pass therethrough without permitting an equivalent amount of fluid or solvent to pass.

At least certain of the wall, membranes or diaphragms are "perm-selective," in the sense that they are permeable to ions of one sign while being passage-resistant to ions of the opposite sign.

Numerous materials are known, and are commercially available which can be shaped into thin walls and arranged in such a way that layers of fluids and membranes alternate, the arrangement being, in the event an electric bias is applied, that the electric current traverses a plurality of membranes and fluid layers lying between spaced electrodes.

Preferably, electrodes are present in spaced fluid layers, but there are no electrodes in the intermediate fluid layers so that no electrical decomposition of the solvent fluid takes place in the intermediate chambers.

The perm-selectivity of the membranes arises from the fact that electric fixed charges are bound into the microporous membrane structure. These charges repel ions of the same polarity as the fixed charges, and the membrane thus becomes passage resistant to ions of that polarity. Ions of the opposite polarity are attracted by the bound charges in the membrane and, under the influence of the impressed bias, move through the pores.

Generally, ions are transferred from one fluid volume or layer into an adjacent or the two adjacent fluid layers or, conversely, ions are withdrawn from two fluid layers and are transferred into a third layer lying therebetween. Thus, deionization takes place in the certain fluid layers while [concentation] *concentration* occurs in other fluid layers.

It is possible to operate at rather low voltages, the voltage per fluid cell, including bordering membranes, being preferably less than the decomposition voltage of the fluid. Under such conditions the economy of operation of the apparatus is quite high. However, polarization tends to decrease the efficiency of the apparatus unless suitable measures are taken to diminish, or eliminate it.

The present invention provides an apparatus of high efficiency, and of compact and simple construction. High efficiency is attained by effectively reducing the polarization by high flow rates through long channels which are so shaped as to provide a most advantageous form of flow, a most favorable distribution of current density, and other advantages as will hereinafter appear.

The aforementioned and various other aims, objects and advantages of the invention will appear more fully from the detailed description which follows, accompanied by drawings, showing, for the purpose of illustration, preferred forms of apparatus for practicing the invention.

The invention also consists in certain new and original features of construction and combination of parts, as hereinafter set forth and claimed.

Although the characteristic features of this invention, which are believed to be novel, will be particularly pointed out in the claims appended hereto, the invention itself, its objects and advantages, and the manner in which it may be carried out will be better understood by referring to the following description taken in connection with the accompanying drawings forming a part of it in which:

Figure 1:
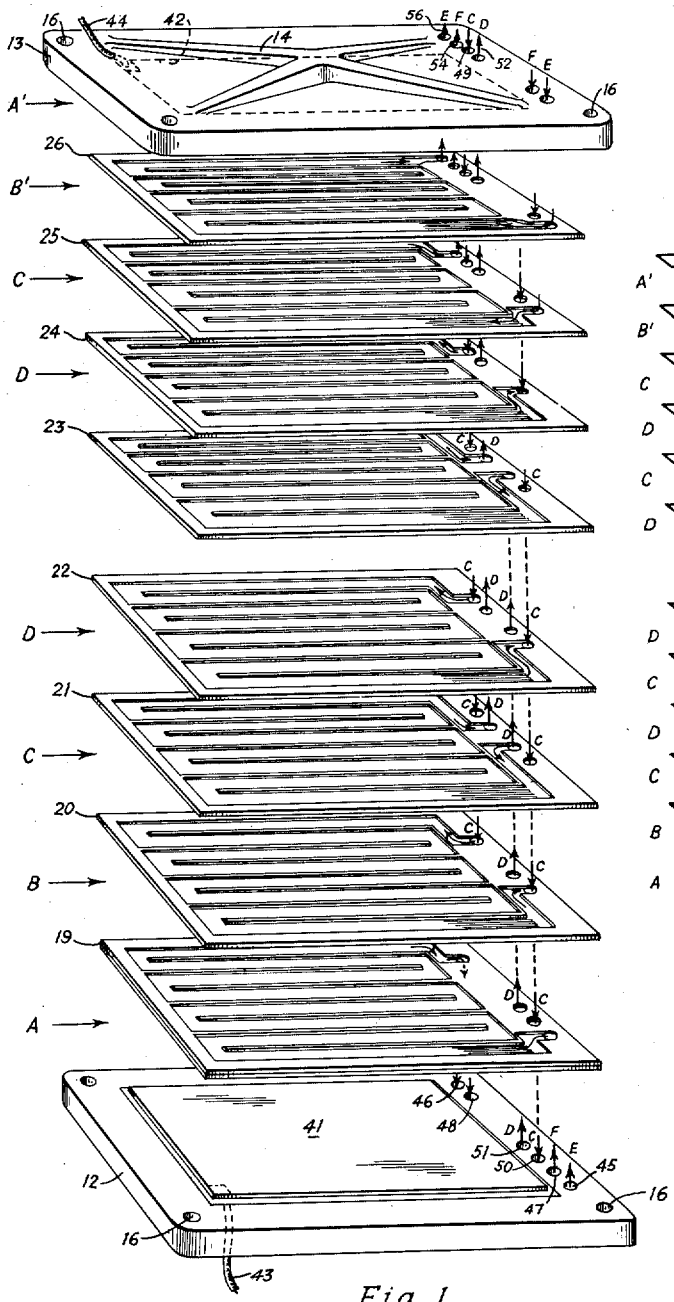
FIG. 1 is an exploded perspective view of an improved apparatus embodying the present invention.

In the following description and in the claims, various details will be identified by specific names for convenience. The names, however, are intended to be as generic in their application as the art will permit. Like reference characters refer to like parts in the several figures of the drawings.

In the drawings accompanying and forming part of this specification, certain specific disclosure of the invention is made for the purpose of explanation of broader aspects of the invention, but it is understood that the details may be modified in various respects without departure from the principles of the invention, and that the invention may be applied to, and practiced by, other structures than the ones shown.

The apparatus 11 comprises two recessed end plates 12 and 13, preferably reinforced by ribs 14. The bolts 15 extend through holes 16 in the plates, and the plates may be drawn towards each other by nuts 17 on the bolts 15 tightening the plates against a stack of membranes 18.

Referring particularly to FIG. 1 in which the end plates and a few membranes are shown in an exploded arrangement, two types of membranes are employed in the illustrated form of apparatus. One type of membrane is permeable to ions of one polarity and passage resistant to ions of the opposite polarity, and the other type of membrane is permeable to ions of the opposite polarity and, suitably, although not necessarily, also passage resistant to ions of the one polarity.

The two types of membranes preferably alternate in sequence in the stack, so that an anion-permeable membrane, for example, follows a cation-permeable membrane and is, in turn, followed by a further cation permeable membrane, and so forth.

Membranes 19, 20, 21, 22, 23, 24, 25 and 26 are shown, it being understood that many more membranes lie between membranes 22 and 23, where the figure is broken to indicate that the center portion of the stack of membranes is not shown.

The membranes may be made of any number of known permselective materials. Materials of high electrical conductivity and high ionic concentration are preferred, particularly polymeric materials, such as the different well-known exchange resins preferably having ionic concentrations of between 2 Normal to 6 Normal in water immersion. Membranes may be made from ion exchange resins, such as any of the cationic and anionic "Amberlite" resins by cementation of resin particles, beads or granules of about ".001 to 0.15" diameter with a cement of porosity of the order of 10 A. to 200 A. pore size. The effective pore size of the resin is preferably 10 A. to 40 A. The resin granules may also be polymerized together in a manner well known in the art.

In the Journal of Physical and Colloid Chemistry, vol. 54, pages 204 to 226 (1950), Wyllie and Patnode described in considerable detail the preparation and properties of improved membranes. Wyllie and Patnode's method consists of imbedding a suitably ground ion exchange resin into a plastic matrix by compression at an elevated temperature.

The [natural] *neutral* membranes may be made of a porous material of 10 A. to 1000 A. pore size when immersed in water. Cellophane or resin impregnated porous paper, porous hard rubber, or thermoplastic of a porosity sufficiently high to give an electrolytic conductivity of the order of ½ to ⅕ of that of an ionic solution upon immersion in said solution are satisfactory. Preferably, such porous substances are made of amphoteric resins in a manner similar to the cation or anion exchange resins, except that the resin beads or granules contain both cationic and anionic groups in equivalent quantities, polymerized to form a strongly water swelling structure, of a water content of 50 to 80% upon water immersion. The membrane has a high electrolytical conductivity as a result of the high ionic concentration of the fluid within the pores. The conductivity of the water immersed neutral membranes is preferably of the order of a 0.1 N to 1.0 N NaCl solution.

The amphoteric resin may be polymerized from a mixture of cation and anion monomer molecules, or from a mixture of cation and anion polymer or chain molecules. It may also be made by cementing together a mixture of small granules of cation and anion exchange resin in equivalent quantities with an electrolytically conductive porous cement with pores of size 10 A. to 500 A.

Anion resins and cation resins suitable for the preparation of membranes are commercially available under a variety of trade names. The synthesis of such materials is described by Kunin and Myers in "Ion Exchange Resins," Wylie and Sons, 1950, beginning with page 54, and by Nachod in "Ion Exchange," Academic Press, 1949, beginning with page 48. Both textbooks list commercially available ion exchange resins by their respective trade names, giving the names of their manufacturers and principal composition.

Membrane materials permit shaping into various forms either during the process of manufacture or thereafter. In the first instance, the shaping may be accomplished by molding, in the latter instance by machining or assembly from sheet material.

The membranes may be of unitary structure, that is to say of one piece, or they may be composition membranes in which event an active microporous layer is carried by a generally inactive macroporous carrier or backing, either as a thin layer bonded to the carrier or carried within the pores of the carrier. Such construction is known. For instance the active substance may be polymerized in the pores of a battery separator, forming a layer of a friction of the thickness of the separator or permeating it throughout.

Considering, for example, membrane 21, the membrane is of generally rectangular shape and has a side extension 27. Apertures 28, 29, 30 and 31 extend through the extension and form ducts in a stack of membranes having similar apertures in registry with apertures 28, 29, 30 and 31. The membrane has a peripheral sealing rim

32 of which the extension 27 forms a part and the sealing rim may be provided with a compression ridge 33, as commonly employed on flat sealing surfaces.

A depressed fluid channel 34 extends between the aperture or duct 29 and the aperture or duct 30. The depression 34 forms a close channel when the membranes are stacked. The channel is formed by substantially parallel sealing ribs 35 and 36 which extend part way across the body of the membrane. These ribs are in sealing engagement with the adjacent membrane either by mere contact or by means of added adhesive on the ridges as indicated at a. The ribs 35 and 36 are integral with and extend from, the marginal sealing portion in opposite directions, so as to form a channel repeatedly returned upon itself. The ribs 35 extend in one direction and terminate short of the opposite portion of the sealing rim 32 at a distance approximately equal to the spacing between the ribs 35 and 36. The ribs 36 extend from the opposite portion of the sealing rim and likewise terminate at a distance such that the turned-around portions of the channel have substantially the same cross sectional dimension as the straight portions of the channel. In this manner constricted portions are avoided in the long zigzag flow channel extending from duct 28 to duct 29 back and forth across the body of the membrane. The sealing ribs are preferably made of the same material as the membranes and increase the active membrane surface.

Preferably, the height of the sealing ridges 35 and 36 is equal to the thickness of the marginal portion 32 and of the flange extension 27. The peripheral seal may be improved by the additional peripheral sealing ridge indicated at 33. The latter constitutes only a minor elevation above the marginal sealing surface 32, and its purpose is to dig into the surface of the next membrane as a further precaution against leakage when the stack is being compressed.

The spacing between successive ribs 35 and 36 may be uniform. However, in many instances it is desirable to make the channel progressively wider or narrower, thicker or thinner, along the flow path for reasons which will hereinafter become apparent.

The channel 34 may be provided with spacers 40 for positively spacing the sides of the fluid channel which are formed by the membrane walls. The spacers prevent partial caving-in of the membrane formed channel walls under the force of compression of the stack. This is particularly important where the channels are relatively wide.

Figure 3:
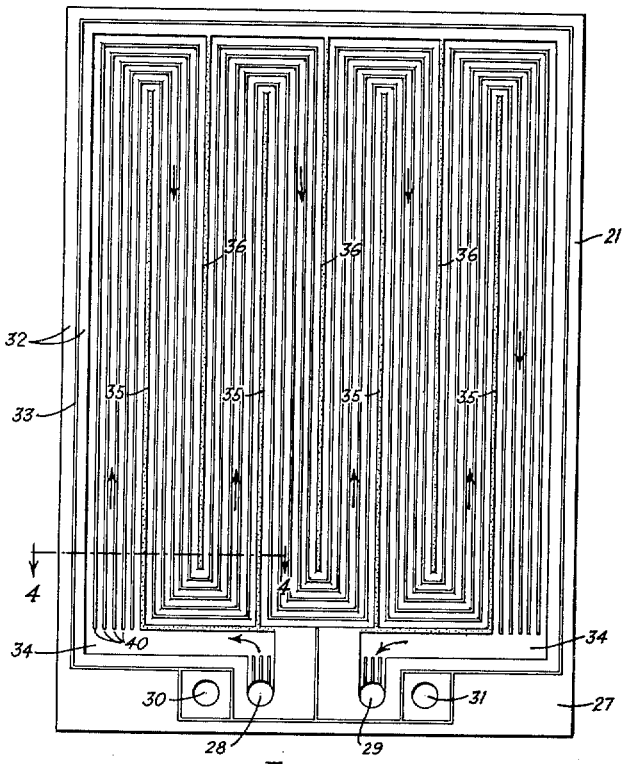
FIG. 3 is a view of a face of a preferred form of membrane.
Figure 4:
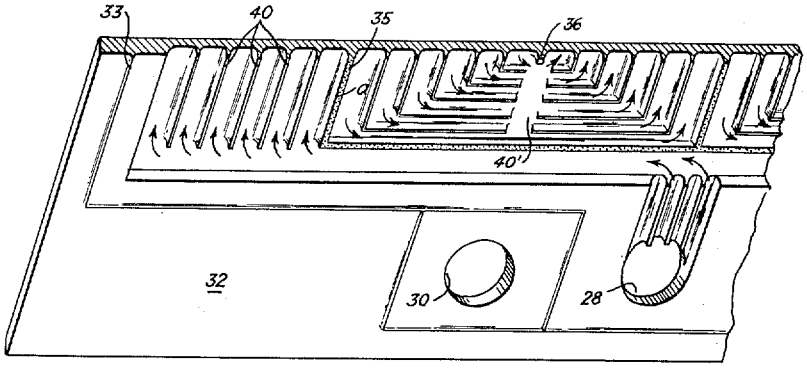
FIG. 4 is a perspective view, on an enlarged scale, of a corner portion of a membrane similar to the membrane of FIG. 3.
Figure 5:
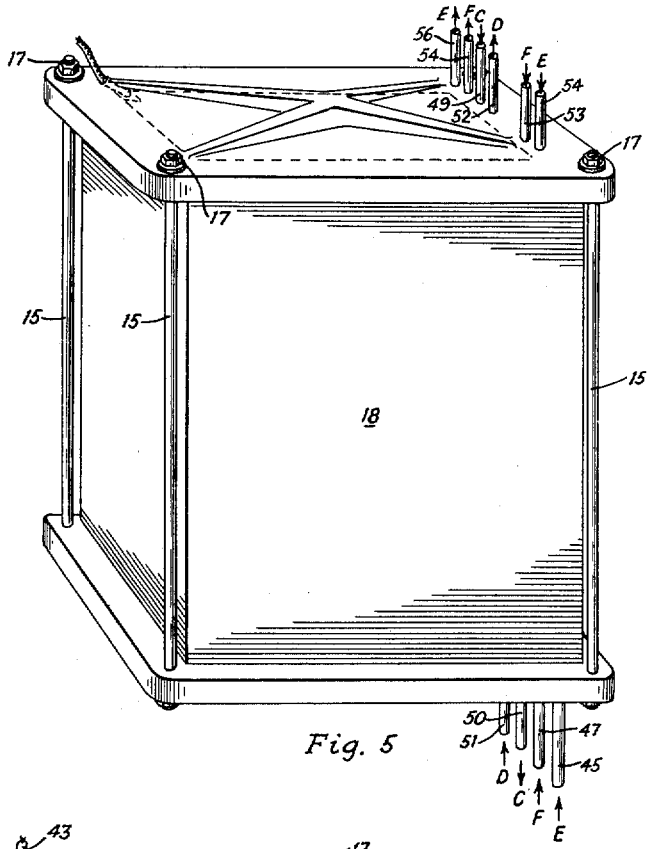
FIG. 5 is a perspective view of the apparatus, the apparatus being turned on its side.
Figure 6:
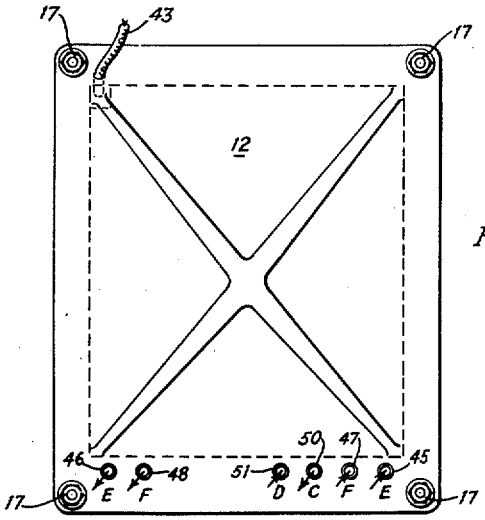
FIG. 6 is an end view of that portion of the apparatus which is not visible in FIG. 5.
Figure 7:
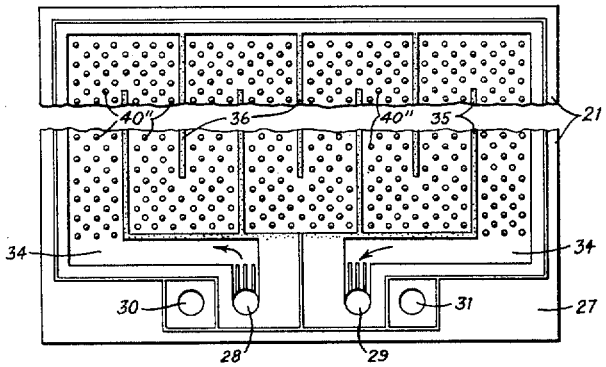
FIG. 7 is a plan view of a corner portion of a modified form of membrane.

The spacers 40 may be continuous ridges, as shown in FIG. 3, or they may be interrupted ridges as shown in FIG. 4, the points of interruption being marked 40'. These points permit a certain amount of cross flow between the individual channel branches formed by the ridges. Such cross flow is likely to occur if one of the channel branches is obstructed. FIG. 7 illustrates a construction where the separators have the form of projections or posts 40'' of substantially circular cross-section. The separators 40, 40'' need not be of the same height as the sealing ridges 35', 36 and need not bear against the next membrane with sealing tightness.

It is readily seen that the zigzag arrangement of the fluid channel 34 accommodates a long flow path within a relatively small membrane.

The flow velocity within the channel may be maintained uniform, or it may be increased or decreased. Such increase or decrease may be brought about by a progressive narrowing or widening of the flow channel from inflow to outflow.

Also, loss of fluid, by transfer of fluid through the membrane may be compensated for by a progressively narrowing channel so that the flow velocity is not decreased by reason of fluid transfer.

If, on the other hand, the fluid volume is increased by fluid transfer through the membrane, it may be desirable to allow for such increase by a widening of the channel towards the outflow.

One of the main purposes of varying the flow velocity is to counteract polarization. Polarization increases as the current density increases, or the normality, the ionic concentration, of the fluid decreases. As fluid subject to deionization flows towards the outflow end of the channel its ionic concentration decreases more rapidly than the current density to which it is subjected. As a result polarization tends to increase towards the outflow.

As an effective counter-measure the flow velocity of the fluid may be increased so that the polarization layer is reduced by a fluid flow of higher velocity. Also the repeated change in direction of the flow causes turbulence which further reduces the tendency of a polarization layer to form.

Assuming, as a specific example, that the fluid loss by fluid transfer through the membrane is 20%, it is advantageous not only to change the fluid channel to prevent reduction in velocity by reason of the fluid loss, but to increase the velocity considerably by reducing the width of the fluid channel more than would be necessary to maintain the velocity uniform. A reduction of the cross section of the channel by 50%, for example, actually increases the flow velocity towards the outflow and effectively overcomes the tendency of polarization.

Figure 8:
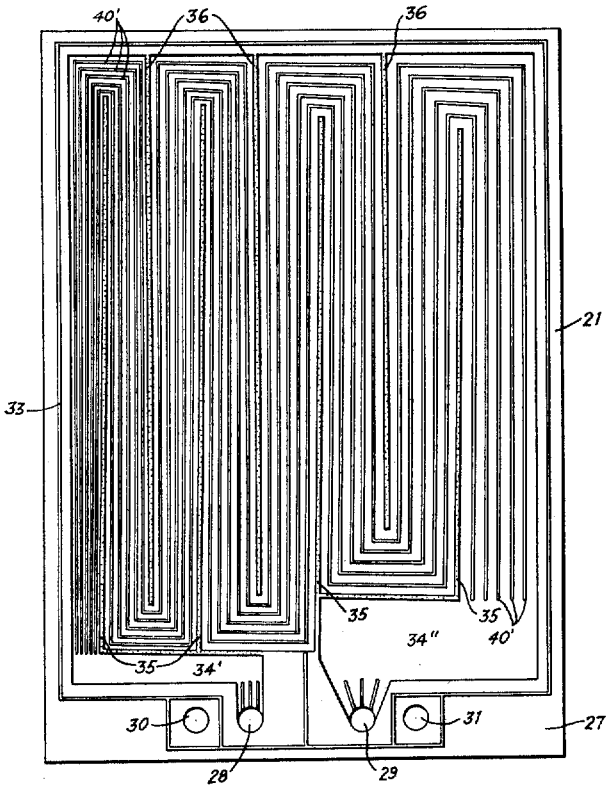
FIG. 8 is a plan view of a membrane having flow channels of progressively changing cross-section.

FIG. 8 illustrates a membrane in which the cross section of the flow channel gradually decreases along the flow path.

Electrodes 41 and 42 are mounted in the recesses of the end plates and conductors 43 and 44 lead through the walls of the end plates with regard to which they are sealed. The electrodes are insulated with regard to the end plates, and the voltage applied to the electrodes produces a current traversing the membranes and the fluid volumes which move along the faces of the membranes as narrow films in the zigzag channels.

Fluid is conducted into and out of the channels through the aforementioned ducts in the marginal extensions 27 of the membranes.

In order to amplify the description, the fluid chambers are identified by capital letters. Chambers A and A′ are terminal chambers in which the electrodes are located. Chambers B and B′ may be termed guard chambers. Their main purpose is to prevent decomposition products in the terminal chambers A and A′ from contaminating the fluid in the intermediate chambers containing the fluid which is to be deionized or ion enriched.

Considering now the flow of fluids through the apparatus, fluid enters the terminal electrode compartment A through a duct 45 and leaves the electrode through a duct 46. This arrangement permits separate handling and disposal of the fluid which is under the direct action of the electrode 41 and is in actual contact with the electrode.

Fluid enters the guard compartment B through a duct 47 and flows outwardly through the channel of the membrane 19 to leave the compartment through a duct 48.

The compartment C may be termed concentration compartment. Fluid enters the concentration compartment through a duct 49 and leaves the compartment through a duct 50. This duct, it will be noted, extends through all the remaining membranes and through the other end plate 13.

The compartment D may be termed deionization compartment or dilution compartment. Fluid enters this compartment through a duct 51 extending through the end plate 13 and all the remaining membranes. Deionized fluid leaves the compartment D through a duct 52.

The compartment formed by the channel in the membrane 22 is a concentration compartment into which fluid enters through the duct 49 and from which it leaves through the duct 50.

It will be noted that the ends of the concentration passages in membranes 20, 22 and 24 are manifolded, or lie in parallel. Similarly, the ends of the dilution channels in the membranes 21 and 23 are manifolded, or lie in parallel, it being understood that there may be a great number of membranes carrying such dilution channels.

The compartment B′ is a guard compartment for the second electrode 42. It receives fluid through a duct 53 and the fluid leaves the guard compartment through a duct 54.

The electrode chamber A′ has an inlet duct and fluid is discharged from the electrode chamber through a duct 56.

The apparatus operates as follows:

The fluid to be deionized is supplied to the deionization compartment through the duct 51 to which all the deionization channels are connected. The fluid flows across the faces of the membranes in a long zigzag path.

The current flowing from one electrode to the other causes the anions to move in one direction and the cations to move in the opposite direction. The arrangement is such that the cations leave the deionization compartment through a bordering cation permeable membrane in the direction towards the cathode, and that the anions leave the deionization compartment through an anion permeable membrane in the opposite direction towards the anode. As previously mentioned, the next membrane encountered by the anions is an anion-passage-resistant membrane, causing the anions to accumulate in front of it. Similarly, the next membrane encountered by the cations is cation-passage-resistant, causing the cations to accumulate in front of it in a concentration chamber.

Simultaneously, cations enter the concentration compartment in a direction opposite to the migration of the entering anions, and anions enter the concentration compartments in a direction opposite to the migration of the entering cations. The result is a concentration of ions in the concentration compartments.

Assuming, more specifically, that the electrode 41 is an anode and that the electrode 42 is a cathode, and assuming further that the membranes 19, 21, 23 and 25 are anion permeable and cation-passage-resistant, and assuming further that the remaining membranes 20, 22, 24 and 26 are cation permeable, the anions in the fluid in the chamber D migrate through the membranes 21, 23 and 25 and accumulate in the compartments C which they cannot leave because of the resistance to the passage of anions of the membranes 20, 22, 24 and 26.

The cations leave the deionization compartments D in the opposite direction, and pass through the membranes 20, 22 and 24. The cations thus migrate into concentration chambers where they combine with an equivalent number of anions which enter the respective concentration chambers from the opposite direction.

The fluid is subjected to the action of the current for a considerable time due to the length of the fluid passages along the face of the membranes. The fluid may flow at a considerable velocity, of the order of one foot per second. The rapid flow, and the repeated change in direction, effectively remove insulating and polarization layers which reduce the efficiency of the apparatus. These ionization layers are primarily ion-depleted fluid layers which, due to the ion depletion, become increasingly non-conductive. As previously mentioned, the flow velocity in the deionization compartment may be increased towards the outflow by making the flow channel progressively narrower towards the outflow. This is illustrated in FIG. 8.

Any decomposition products formed in the terminal electrode chambers A and A′ are removed therefrom through the ducts 46 and 56, respectively.

The guard compartments B and B′ likewise have separate outflow ducts 48 and 54, respectively, and their products are not mixed with the products of the other intermediate chambers whose discharge ducts 52 and 53 are not in communication with the outflow ducts of the electrode compartments and of the guard compartments.

It is understood, however, that the guard compartments may be omitted in installations where contamination of the output of the concentration compartments and of the dilution compartments by products of the electrode compartments is no danger.

Figure 2:
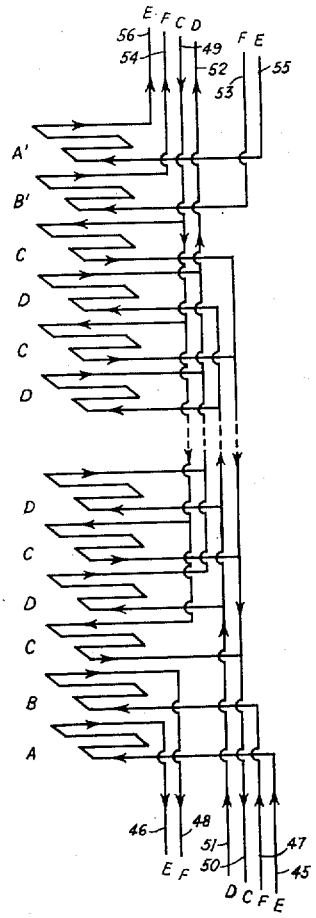
FIG. 2 is a perspective flow diagram of the apparatus shown in FIG. 1.

As is apparent from FIG. 1, the membrane 19 is double-faced or composed of two individual membranes to provide for zigzag channels not only in the guard compartment B, but also for a similar flow channel in the electrode compartments A, as indicated in the diagrammatic FIG. 2.

EXAMPLES

Two electrodialyzers of identical dimensions were constructed, each apparatus comprising two diluting chambers, three concentrating chambers and two electrode chambers, the arrangement being as follows: anode, cation membrane, anion membrane, cation membrane, anion membrane, cation membrane, anion membrane, cathode. The membranes measured 20 mm. by 100 mm. by 1 mm.

The membranes were molded according to the Wyllie and Patnode technique disclosed in the Journal of Physical and Colloid Chemistry, volume 54, pages 204–226, February 1950, particular data being as follows: Amberlite IR–120 was used in the manufacture of the cation membranes and Amberlite IRA–400 was used in the manufacture of the anion membranes. The Amberlite was used in air-dried condition, as disclosed by Wyllie, and was of a means particle size of about 0.1 mm. diameter. Polyethylene of a mean particle size of 0.05 mm. was used as a binder and 28% binder, by weight, was [combinted] *combined* with 72% of ion exchange resin. The mixture was placed in a mold, pressure of about 500 lb. per square inch was applied and then the temperature was increased to a maximum of 150 degrees C. When 140 degrees C. was reached, the pressure was increased to 2500 pounds and maintained one minute after the temperature of 150 degrees C. was reached, a total time of about five minutes. After molding the membrane surface was slightly ground with an abrasive to remove any possible surface film of binder material.

Apparatus I was constructed with flat membranes separated by flat non-conductive spacers of polyethylene sheet material of 1 mm. thickness.

Apparatus II was constructed with ion conductive spacers extending from one side of the membranes and consisting of the same material as the respective membrane, the height of each rib being 1 mm.

Before the test the membranes of each apparatus were equilibrated in an aqueous NaCl solution 1000 p.p.m. concentration.

Tests were conducted as follows:

Test A.—All the chambers of the two forms of apparatus were filled with an aqueous NaCl solution of 1000 p.p.m. concentration. A potential of 5 volts of direct current was applied to the electrodes for fifteen minutes, the dilute was then removed from both diluting chambers, mixed and tested to determine the reduction of ion content by specific resistivity.

The following results were obtained:

Apparatus I (having non-conductive spacers): 685 p.p.m.
Apparatus II (embodying the invention): 455 p.p.m.

The test establishes that a considerably higher degree of deionization is obtained by the apparatus employing ion conductive spacers than by an apparatus employing insulating spacers.

Test B.—The effect of the ion conductivity of the spacers on the total ohmic resistance of the apparatus was then tested in the following manner: The electrode chambers and the deionization chambers were filled with an aqueous NaCl solution of 5000 ohms resistivity, as determined by an A.C. measurement at 1000 cycles. The concentration chambers of the apparatuses were filled with an aqueous NaCl solution of 500 ohms resistivity.

The total resistance of the two apparatus were then measured with the following results:

Apparatus I (having non-conductive spacers): total resistance 360 ohms
Apparatus II (having conductive spacers): total resistance 95 ohms.

Test C.—The electrical resistance of the two apparatuses was then compared after removal of the concentrate from the concentration chambers and removal of the dilute from the deionization chambers, leaving only the electrolyte in the electrode chambers.

Apparatus I—total resistance—infinite
Apparatus II—total resistance—115 ohms

This test establishes that advantages are gained by employing ion conductive spacer ribs in an apparatus where conditions may arise (by obstruction of fluid passages or otherwise) under which conditions the deionization in one or several deionization compartments is carried to a higher degree than the deionization in other compartments.

Test D.—Such a condition was simulated as follows: One of the deionization compartments was filled with an aqueous NaCl solution of 500 p.p.m. concentration. The other deionization compartment and the concentrating compartments were filled with an aqueous NaCl solution of a concentration of 1000 p.p.m. A flow of electrolyte was maintained through the electrode compartments at the rate of 5 cc. per minute. Both apparatuses were operated for five minutes at 7 volts, the contents of the deionization chambers were then removed and were tested with the following results:

Apparatus I (having non-conductive spacers):
- Deionization compartment A—ion content reduced from 500 p.p.m. to 440 p.p.m.
- Deionization compartment B—ion content reduced from 1000 p.p.m. to 780 p.p.m.

Apparatus II (having ion conductive spacers):
- Deionization compartment A—ion content reduced from 500 p.p.m. to 325 p.p.m.
- Deionization compartment B—ion content reduced from 1000 p.p.m. to 355 p.p.m.

What is claimed is:

1. An apparatus for treating separate volumes of ionic solution by transferring ions of both polarities from certain fluid containing chambers into other fluid containing chambers, the apparatus comprising, a plurality of substantially parallel membranes, certain membranes being permeable to ions of one polarity and passage resistant to ions of the opposite polarity, other membranes being permeable to ions of the opposite polarity, said membranes being provided with raised marginal sealing portions along which the membranes rest against one another in sealing relationship to form fluid chambers, said membranes further comprising sealing ribs integral with the membranes extending from a marginal sealing portion across the body of the membrane and terminating short of the opposite sealing portion, adjacent sealing ribs extending from opposite sides, thereby forming a fluid channel composed of substantially parallel channel portions turned back upon themselves, spacer elements between said ribs, said spacer elements being integral with the membrane and bearing against the next membrane for positively spacing the membranes apart, said spacer elements being substantially symmetrical with respect to the two membranes between which they extend, so as to impede the flow along the two membrane surfaces equally, the ribs of at least certain membranes being convergent so as to produce between them a channel of progressively decreasing width from one end of the channel towards the other, said membranes further including duct forming registering apertures in said marginal portions, said apertures leading to the ends of the channel formed by the ribs.

2. An apparatus for treating separate volumes of ionic solution by transferring ions of both polarities from certain fluid containing chambers into other fluid containing chambers, the apparatus comprising, a plurality of substantially parallel membranes, certain membranes being permeable to ions of one polarity and passage resistant to ions of the opposite polarity, other membranes being permeable to ions of the opposite polarity resulting in the formation of dilution chambers and concentration chambers in alternating order, said membranes being provided with raised marginal sealing portions along which the membranes rest against one another in sealing relationship to form fluid chambers, said membranes further comprising sealing ribs integral with the membranes extending from a marginal sealing portion across the body of the membrane and terminating short of the opposite sealing portion, adjacent sealing ribs extending from opposite sides, thereby forming a fluid channel composed of substantially parallel channel portions turned back upon themselves, the flow channel of at least certain of the dilution chambers being convergent from inflow toward outflow so as to produce an increase of the flow velocity of liquid flowing therethrough, said membranes further including duct forming registering apertures in said marginal portions, said apertures leading to the ends of the channel formed by the ribs.

3. An apparatus for treating separate volumes of ionic solution by transferring ions of both polarities from certain fluid containing chambers into other fluid containing chambers, the apparatus comprising, a plurality of substantially parallel membranes, certain membranes being permeable to ions of one polarity and passage resistant to ions of the opposite polarity, other membranes being permeable to ions of the opposite polarity, said membranes being provided with raised marginal sealing portions along which the membranes rest against one another in sealing relationship to form fluid chambers, said membranes further comprising sealing ribs integral with the membranes extending from a marginal sealing portion across the body of the membrane and terminating short of the opposite sealing portion, adjacent sealing ribs extending from opposite sides, thereby forming a fluid channel composed of channel portions turned back upon themselves, said membranes further including duct forming registering apertures in said marginal portions, said apertures leading to the ends of the channel formed by the ribs, the ribs of at least certain membranes being convergent so as to produce between them a channel of progressively decreasing width from one end of the channel towards the other.

*4. An electrodialyzer comprising, spaced electrodes, spaced membranes between said electrodes defining a flow channel for liquid between the membranes, the channel having an inlet and an outlet, at least one of said membranes being ion-selective, the membrane arrangement with respect to the polarity of the electrodes being such that the liquid channel becomes a deionization space, the cross sectional area of the channel decreasing from inlet to outlet to produce a corresponding increase in the linear flow velocity of a liquid passing through said channel.*

*5. An electrodialyzer comprising, spaced electrodes, a pair of spaced ion-selective membranes between said electrodes defining a flow channel for liquid between the membranes, the channel having an inlet and an outlet, a membrane contacting ion-conductive spacer in said channel, the membrane arrangement with respect to the polarity of the electrodes being such that the liquid channel becomes a deionization space, the cross sectional area of the channel decreasing from inlet to outlet to produce a corresponding increase in the linear flow velocity of liquid passing through said channel.*

*6. An electrodialyzer comprising, spaced electrodes; a plurality of spaced membranes between the electrodes, at least certain of said membranes being ion-selective, said membranes forming concentrating spaces and deionization spaces between them; and conduit means for conducting liquid into, and out of, said deionization spaces, the liquid passage through said deionization spaces being of progressively decreasing cross section from the inflow into the electrodialyzer towards the outflow, resulting in an increase in flow velocity from inflow to outflow.*

*7. An electrodialysis apparatus comprising, spaced electrodes; a plurality of spaced membranes arranged in a stack between the electrodes, at least certain of said membranes being ion-selective, said membranes forming concentrating spaces and diluting spaces within the apparatus; means forming an inflow port for admitting liquid to be deionized into the apparatus; means forming an outflow port for discharging deionized liquid from the apparatus; and means forming a liquid passage through diluting spaces from said inflow port means to said outflow port means, said passage comprising distinct successive passes extending across the stack, the mean cross section of successive passes decreasing from inflow towards outflow to produce a corresponding increase in linear flow velocity of the liquid flowing therethrough.*

*8. An electrodialysis apparatus comprising, spaced electrodes; a plurality of spaced membranes arranged in a stack between the electrodes, at least certain of said membranes being ion-selective, said membrances forming concentrating spaces and diluting spaces within the apparatus; means forming an inflow port for admitting liquid to be deionized into the apparatus; means forming an outflow port for discharging deionized liquid from the apparatus; and means forming a liquid passage through diluting spaces from said inflow port means to said outflow port means, said passage comprising branches arranged in parallel, the mean cross section of the passage decreasing from inflow towards outflow to increase the linear flow velocity of the liquid correspondingly.*

*9. In the method of deionizing a liquid by passing the liquid through deionizing chambers of a multicompartment system comprising ion-selective membrances and electrodes between which a current flows through said chambers and membranes, the step of progressively increasing the linear flow rate of the said liquid by progressively decreasing the cross section of the flow passage as the liquid becomes progressively depleted of ions in its passage through the system.*

*10. In the method of deionizing a liquid by passing the liquid through deionizing chambers of an electrodialyzer comprising ion-selective membranes defining such chambers between a pair of electrodes and passing an electric current from one electrode to the other through the chambers and the liquid therein, the step of varying the linear flow velocity of the liquid by progressively decreasing the cross section of the flow passage to change the flow velocity in inverse relation to the ionic concentration of the liquid.*

*11. The method of reducing polarization in the liquid stream undergoing deionization in an electrodialysis system comprising a pair of electrodes and selectively ion permeable membranes between said electrodes which membranes confine the liquid stream, the step of progressively increasing the linear flow rate of said liquid stream by variation of the cross section of the liquid stream as the deionization of the stream progresses.*

(References on following page)

References Cited in the file of this patent or the original patent

UNITED STATES PATENTS

| | | |
|---|---|---|
| 1,868,955 | Tachukawa | July 26, 1932 |
| 2,694,680 | Katz | Nov. 16, 1954 |
| 2,708,658 | Rosenberg | May 17, 1955 |
| 2,767,135 | Juda | Oct. 16, 1956 |
| 2,777,811 | McRae et al. | Jan. 15, 1957 |
| 2,799,644 | Kollsman | July 16, 1957 |
| 2,897,130 | De Haas Van Dorsser | July 28, 1959 |

FOREIGN PATENTS

| | | |
|---|---|---|
| 21,727 | Great Britain | Oct. 29, 1914 |
| 352,977 | Germany | May 11, 1922 |